Patented July 21, 1931

1,815,056

UNITED STATES PATENT OFFICE

HELLMUT FISCHER, OF BERLIN-FRIEDENAU, GERMANY, ASSIGNOR, BY MESNE ASSIGNMENTS, TO METAL & THERMIT CORPORATION, OF NEW YORK, N. Y., A CORPORATION OF NEW JERSEY

PRODUCTION OF INDUSTRIALLY VALUABLE BERYLLIUM SALTS FROM BERYLLIUM-BEARING MINERALS

No Drawing. Application filed December 13, 1928, Serial No. 325,928, and in Germany December 17, 1927.

My invention relates to the production of industrially valuable beryllium salts from beryllium-bearing minerals, and has for its object to substitute a convenient and relatively low cost process for the processes employed hitherto which were relatively complicated and, as a rule, gave only a low yield of beryllium.

According to my present invention the beryllium-bearing mineral is treated with a silico-fluoride of an alkali metal or of an earth alkali metal, and the resulting mass is heated to a relatively high temperature. If for instance, the raw material consists of beryl (a silicate of beryllium and aluminium), the temperature employed for this heating should be about from 650 to 900° C. The mineral, in the gangue portion thereof, generally contains some iron, and the treatment just described converts the aluminium fluoride and the iron fluoride into basic salts, while the complex beryllium fluoride remains unaltered. This treatment therefore enables me to separate the beryllium compounds from the salts contained in the gangue or produced therefrom. Such separation may, for instance, be effected by leaching the mixture, subsequent to the heating, with cold water. This will bring about an almost complete solution of the beryllium salt, whereas the basic salts of aluminium and iron remain undissolved. If hot water were used for leaching, it would be impossible to separate beryllium from aluminium, since in this case not only the beryllium would be dissolved, but also a large portion of the aluminium.

The solution obtained by leaching with cold water is evaporated to dryness and yields a product valuable in different industries, such product being a halide of beryllium and of an alkali metal, or a halide of beryllium and of an earth alkali metal. These halides, and particularly the fluorides, are especially valuable as raw materials for the production of a melt by the electrolysis of which metallic beryllium is to be produced.

Of course the salt obtained by evaporating the solution may also be utilized for the production of any other beryllium salt, by employing suitable reagents.

The process so far as described above, yields chiefly complex beryllium salts, and if it be desired to obtain therefrom simple beryllium salts, the hydroxide of an earth alkali metal is preferably added to the solution of the complex beryllium salt. Among such hydroxides I find that barium hydroxide $Ba(OH)_2.8H_2O$ and calcium hydroxide $Ca(OH)_2$ are particularly suitable. Extensive experiments, however, have shown that the hydroxides of earth alkali metals, when brought in contact with soluble complex beryllium halides, will at once be converted under formation of practically insoluble halides of the earth alkali metals. These hydroxides during the reaction act with an alkalinity strong enough to precipitate beryllium as the hydroxide. The beryllium hydroxide is precipitated in quantitative amount, there being no losses of beryllium.

In order to separate the beryllium hydroxide from the fluoride of the earth alkali metal, I may, for instance, add to a solution of these two compounds, an amount of acid equivalent to the beryllium hydroxide; I thus obtain the beryllium salt of the particular acid employed, and this salt can be separated readily from the halide of the earth alkali metal, by leaching with cold water. Nearly all known simple beryllium salts are readily soluble in water, particularly the halides, the nitrate, the sulfate and the acetate. When applying this treatment with acid, the halide of the earth alkali metal remains undissolved. I may add that an attempt to substitute the carbonate of an earth alkali metal for the hydroxide of such metal did not yield any practical result.

I will now describe in detail two examples showing how my invention may be carried out.

First example

One part (by weight) of beryl mineral and one part of sodium silico fluoride are heated for a considerable time, for instance, several hours, to a relatively high temperature, for instance, 700° C., the operation being carried out in an iron crucible. The resulting sintered mass is then again heated for some time to a temperature of about 800° C., whereupon such mass is comminuted and leached with cold water. The resulting solution is evaporated to dryness and gives a good yield of beryllium sodium fluoride.

If it is desired to subject this product to further treatment, I may produce an aqueous solution containing say 1.3 kilograms of sodium beryllium fluoride, $Na_2BeF_4$, and thereto 3.5 kilograms of barium hydroxide, $Ba(OH)_2.8H_2O$. This results in the formation of a precipitate consisting of barium fluoride and beryllium hydroxide. After separating the deposit from the solution, such precipitate may be further treated with a suitable acid, for instance, hydrofluoric acid. This treatment produces a solution of beryllium fluoride, while barium fluoride remains undissolved. Tests have shown that this treatment will yield, as beryllium fluoride, practically the entire amount of beryllium contained in the beryl mineral.

*Second example*

I again leached beryl with sodium silico fluoride, thus producing a solution of sodium beryllium fluoride $NaBeF_3$, to which I added calcium hydroxide. If, for instance, the solution contains eight kilograms of sodium beryllium fluoride, a like amount of calcium hydroxide may be used. The resulting precipitate can be subjected to further treatment in the same manner as has been described above in connection with the first example. In this second case as well, practically the entire amount of beryllium contained in the mineral is obtained, as beryllium halide.

In each of these two examples, the heat employed is sufficient to bring the mixture of beryllium-bearing mineral and silicofluoride to incandescence.

While in some of the appended claims I have referred specifically to a silico-fluoride of an alkali metal, it will be understood that a silico-fluoride of an earth alkali metal is to be considered as an equivalent, and said claims are to be interpreted as covering such equivalent.

I claim:

1. The process of obtaining industrially valuable beryllium salts, which comprises heating a beryllium-bearing mineral together with a silico-fluoride, to incandescence, comminuting the resulting mass and leaching it with cold water, adding the hydroxide of an earth alkali metal to the resulting solution, and subjecting the resulting precipitate to further treatment for the production of beryllium.

2. The process of obtaining industrially valuable beryllium salts, which comprises heating a beryllium-bearing mineral and an alkali silico-fluoride together for some time to incandescence, comminuting the resulting product and dissolving it in cold water, adding the hydroxide of an earth alkali metal to the resulting solution, separating the resulting precipitate from the remaining dissolved portion, treating such precipitate with a halogen-hydrogen acid, and leaching the product with cold water to separate the resulting beryllium halide from the earth alkali halide.

3. The method of obtaining industrially valuable beryllium salts, which comprises heating a mixture of a beryllium-bearing mineral with a silico fluoride at a temperature above 600° centigrade for so long a time that the mixture sinters without fusing, crushing the sintered product, leaching the same with cold water and separating beryllium salts from the solution so obtained.

4. The method of obtaining industrially valuable beryllium salts, which comprises heating a mixture of beryl and sodium silico fluoride in equal amounts by weight to a temperature between 700 and 800° centigrade, crushing the resulting product and leaching the same with cold water and separating beryllium salts from the solution so obtained.

In testimony whereof I affix my signature.

HELLMUT FISCHER.